United States Patent
Maurudis et al.

(10) Patent No.: US 6,173,247 B1
(45) Date of Patent: *Jan. 9, 2001

(54) METHOD AND APPARATUS FOR ACCURATELY MODELING DIGITAL SIGNAL PROCESSORS

(75) Inventors: Anastasios S. Maurudis, Manchester, CT (US); John O. Della Morte, Jr., Forestdale; James T. Della Morte, Sandwich, both of MA (US)

(73) Assignee: DSP Software Engineering, Inc., Bedford, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/096,774

(22) Filed: Jun. 12, 1998

Related U.S. Application Data (60) Provisional application No. 60/050,111, filed on Jun. 18, 1994.

(51) Int. Cl.[7] .................. G06F 9/455; G06F 9/45
(52) U.S. Cl. .................. 703/23; 703/20; 703/22; 703/27
(58) Field of Search .................. 395/500.48, 500.41, 395/527, 701, 708, 702, 705; 703/20, 26, 27, 2, 13

(56) References Cited

U.S. PATENT DOCUMENTS

| | | | |
|---|---|---|---|
| 4,135,242 | * 1/1979 | Ward et al. | 712/245 |
| 4,893,267 | 1/1990 | Alsup et al. | 364/745 |
| 5,295,222 | 3/1994 | Wadhwa et al. | 395/1 |
| 5,560,013 | * 9/1996 | Scalzi et al. | 395/705 |
| 5,583,983 | 12/1996 | Schmitter | 395/705 |
| 5,613,098 | * 3/1997 | Landau et al. | 395/500.41 |
| 5,732,005 | * 3/1998 | Kahle et al. | 708/495 |
| 5,768,593 | * 6/1998 | Walters et al. | 395/705 |
| 6,011,872 | * 1/2000 | Qian et al. | 382/243 |

FOREIGN PATENT DOCUMENTS 0 718 757 * 6/1996 (EP) .................. G06F/9/302

OTHER PUBLICATIONS

Ombres, D., "C and C++ Extensions Simpilfy Fixed–Point DSP Programming," *EDN,* pp. 135–138, Oct. 10, 1996.

"Digital Signal Processing Solutions Support," http://www.ti.com/sc/docs/dsps/develop/3rdparty/consult/458tarta.htm, (downloaded Jun. 3, 1997).

Robe and Irwin, 'SIMULINK Modules that Emulate Digital Controllers Realized with Fixed–Point or Floating–Point Arithmetic', May 1994.*

(List continued on next page.)

*Primary Examiner*—Kevin J. Teska
*Assistant Examiner*—Lonnie A. Knox
(74) *Attorney, Agent, or Firm*—Hamilton, Brook, Smith & Reynolds, P.C.

(57) ABSTRACT

A method for modeling digital signal processors (DSP) in a C++ environment is disclosed. In particular, the method models and converts an operation (or function) from a floating-point model to a given DSP fixed-point processor model. The invention defines a vector space for each DSP fixed-point processor, as a direct sum of each distinct fixed bit length data representation sub-space. The direct sum of all DSP fixed-point processor vector sub-spaces forms a working vector space. Furthermore, the invention defines an operator projection to be performed on the working vector space such that redundancy in the operational behavior of the DSP's to be modeled may be exploited. In the preferred embodiment, the working vector space is in a C++ environment. A C++ class is defined for each distinct fixed bit length data representation of a given DSP fixed-point processor. The behavior of the given DSP fixed-point processor is then modeled in a C++ environment using the library of classes.

21 Claims, 8 Drawing Sheets

OTHER PUBLICATIONS

Maruudis, A.S., "FACT™: A C++ Environment for Accurately Modeling Fixed–Point Digital Signal Processors," presented at conference on Intelligent Methods for Signal Processing and Communications, Universidad de Vigo, Baiona (Vigo), Spain, Jun. 24–26, 1996.

Maurudis, A.S., "FACT™: A C++ Environment for Accurately Modeling Fixed–Point Digital Signal Processors," The Proceedings of the 7th International Conference on Signal Processing Applications & Technology, vol. 1, p. 846–851, Boston, Mass., U.S.A., Oct. 7–10, 1996.

Marurudis, A.S., "An Efficient Vector–Space Approach for Accurately Modeling Fixed–Point Digital Signal Processors," *1996 IEEE TENCON—Digital Signal Processing Applications*, pp. 659–664 (Nov. 27–29, 1996).

Fortune and Van Wyk, 'Efficient Exact Arithmetic for Computational Geometry', 0–89791–583–6/93/0005/0163, 1993, pp. 163–172.*

Lee and Ho, 'Target bit matching for MPEG–2 Video Rate Control', IEEE 0–7803–4886–9/98, 1998, pp. 66–69.*

Kambi and Follet, 'Error analysis of filters implemented with floaing point arithmetic', IEEE 0–8186–5320–5/94. 1994, pp. 47–51.*

Mark B. Kraeling, 'Fixed–point math in time–critical C applications', ISBN 0–7803–3274–1, pp. 587–593.*

Harton and Kapuscinski, 'BEC++: A software tool for increaded flexibility in algorithm development', IEEE 0–7803–5651–9/99, pp. 67–69.*

Chris Edward, 'Library to model DSP algorithms', Electronics Times, n 908, p14, Jun. 1998, 1 page.*

Robe and Irwin, 'SIMULINK, Modules that emulae digital controllers realized with fixed–point or floating–point arithmetic', IEEE paper; 0–8186–5320–5/94, 1994, pp. 337–341.*

* cited by examiner

POWER STRUCTURE OF CLASS HIERARCHY
FOR EXAMPLE LIBRARY

FIG. 1

```
FLOAT func1(FLOAT);
FLOAT func2(FLOAT);   ← 25
void main{
FLOAT a,b,c;
b=func1(a);
c=func2(b);
return 0;}
```

Pure FLOAT Model

FIG. 2

```
ToInt func1(ToInt);
I64_B func1(I64_B);
FLOAT func2(FLOAT);
void main{
ToInt a,b;                    ← 33a
FLOAT c;
b=func1(a);
c=func2(b.data);

return 0;}
ToInt func1(ToInt d)
{I64_B e(d);
 I64_B f;
 f=func1(e);
 return (ToInt) f;}
```

Mixed Model

FIG. 3

```
FLOAT func1(FLOAT);
ToInt func2(ToInt);
I64_B func2(I64_B);
void main{
FLOAT a;
ToInt b,c;
b.data=func1(a);          ← 33b
c=func2(b);
return 0;}
ToInt func2(ToInt d)
{I64_B e(d);
 I64_B f;
 f=func2(e);
 return (ToInt)f;}
```

Mixed Model

FIG. 4

```
I64_B func1(I64_B);
I64_B func2(I64_B);       ← 35
void main{
I64_B a,b,c;
b=func1(a);
c=func2(b);
return 0;
```

Pure Fixed Model

FIG. 5

| 39 | 38 | 37 | 36 | 35 | 34 | 33 | 32 |
|---|---|---|---|---|---|---|---|
| AG 7 | AG 6 | AG 5 | AG 4 | AG 3 | AG 2 | AG 1 | AG 0 |

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| AH 15 | AH 14 | AH 13 | AH 12 | AH 11 | AH 10 | AH 9 | AH 8 | AH 7 | AH 6 | AH 5 | AH 4 | AH 3 | AH 2 | AH 1 | AH 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| AL 15 | AL 14 | AL 13 | AL 12 | AL 11 | AL 10 | AL 9 | AL 8 | AL 7 | AL 6 | AL 5 | AL 4 | AL 3 | AL 2 | AL 1 | AL 0 |

Layout of TMS320C54x Accumulator A

Layout of TMS320C54x Accumulator B

| 32 | 33 | 34 | 35 | 36 | 37 | 38 | 39 |
|---|---|---|---|---|---|---|---|
| G0 | G1 | G2 | G3 | G4 | G5 | G6 | G7 |
| gh 24 | gh 25 | gh 26 | gh 27 | gh 28 | gh 29 | gh 30 | gh 31 |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| H 0 | H 1 | H 2 | H 3 | H 4 | H 5 | H 6 | H 7 | H 8 | H 9 | H 10 | H 11 | H 12 | H 13 | H 14 | H 15 |
| gh 8 | gh 9 | gh 10 | gh 11 | gh 12 | gh 13 | gh 14 | gh 15 | gh 16 | gh 17 | gh 18 | gh 19 | gh 20 | gh 21 | gh 22 | gh 23 |

21

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| L 0 | L 1 | L 2 | L 3 | L 4 | L 5 | L 6 | L 7 | L 8 | L 9 | L 10 | L 11 | L 12 | L 13 | L 14 | L 15 |
| low 0 | low 1 | low 2 | low 3 | low 4 | low 5 | low 6 | low 7 | gh 0 | gh 1 | gh 2 | gh 3 | gh 4 | gh 5 | gh 6 | gh 7 |

Layout of I40 class data members

FIG. 8

POWER STRUCTURE OF A CLASS HIERARCHY

METHOD AND APPARATUS FOR ACCURATELY MODELING DIGITAL SIGNAL PROCESSORS

RELATED APPLICATIONS

This application claims the benefit of Provisional Patent Application Ser. No. 60/050,111, filed Jun. 18, 1997, the entire teachings of which are incorporated herein by reference.

BACKGROUND

With the explosive growth of the Digital Signal Processor (DSP) market, there has been a direct increase in the use of fixed-point digital signal processors in a variety of industries, such as telecommunications, speech/audio processing, instrumentation, military, graphics, image processing, control, automotive, robotics, consumer electronics and medical technology. In general, fixed-point DSP's compared to floating-point DSP's are less expensive, use less power and less space. One advantage of a floating-point DSP is a smaller development cost (i.e., man hours), however, this is with the compromise of a greater production cost. Thus, if possible, companies are using and will use fixed-point DSP's for their products. In the near future, engineers (users) will be faced with the challenge of real-time implementations of complex DSP algorithms (i.e., functions or operations) on fixed-point DSP'S.

SUMMARY OF THE INVENTION

The present invention is the outcome of Applicants' desire to decrease the development time of fixed-point implementations.

The invention method enables the following development cycle model for the real-time implementation of a given operation/function on a fixed-point DSP:

1) floating-point model
2) fixed-point model
3) real-time implementation.

The development time is drastically reduced using the invention method with the above development model or one similar thereto. By decreasing development time, Applicants have narrowed the advantage gap between floating-point DSP's and fixed-point DSP's.

Besides being able to model a fixed-point DSP in a C++ environment, a supporting library (or more generally, working vector space) expedites the conversion of an operation (or function) from a floating-point model to a given fixed-point processor model; from step 1 to step 2 in the above development model. In a preferred floating-point model, the invention defines a C++ class, say, for example, "FLOAT". The invention attaches various data members to the defined class (e.g., FLOAT) to keep track of pertinent information for transforming a floating-point model to a fixed-point model. Moreover, suppose the floating-point model of an operation/function calls N modules, then one needs a fixed-point model for each of the N modules under each fixed-point processor to be modeled.

The present invention supports situations when one wants to convert only certain modules to a fixed-point processor model while leaving other modules as a floating-point model, such as a fixed-point encoder and a floating-point decoder. In order to accomplish the dual existence of a fixed- and floating-point model, the invention method creates a C++ interface class, to do exactly that, interface a fixed-point module with a floating-point module. In terms of linear algebra, the interface class acts as a transformation operator, transforming from the invention fixed-point model space to a floating-point model space of the present invention.

Thus, the present invention provides a computer method and apparatus for modeling a digital signal processor. In particular, the present invention employs a high level computing language for representing operation of the target processor. Further, the invention provides representations that are bit-wise matchable to machine language output of the target digital processor. The invention representations being bit-wise matchable and in the high level language enables users to directly read and match model executed steps to actual operation steps of the target digital processor.

In the preferred embodiment, the present invention computer system and method models a digital processor by:

(a) providing data representations and operations of a target processor (such as in a library or other source); and (b) using a high level programming language, modeling the data representations and operations of the target processor in a manner such that model generated data is bit-wise matchable to data generated by the target processor, and in human readable terms instead of machine code.

In accordance with one aspect of the present invention, the step of modeling is incremental such that a first set of certain data representations and operations of the target processor is modeled using the high level programming language to form an intermediate model of the target processor. Subsequent to the formation of the intermediate model, at least a second set of data representations and operations of the target processor is modeled using the high level programming language to increment the intermediate model toward a final desired model of the target processor, and so forth with each further subsequent set of data representations and operations.

In accordance with another aspect of the present invention, the target processor data representations and operations are preferably provided in a hierarchy or power class. As such, the library or source of the target processor data representations and operations is formed by the steps of:

for a given source processor, (a) determining each distinct fixed bit length data representation, and (b) grouping the determined distinct data representation to form a set;

for each target processor, repeating steps (a) and (b) such that respective sets are formed; and forming a hierarchy of the formed sets by correlating one set to another, such that a base class with depending subclasses are generated and form the hierarchy, each set being defined by one of the base class and a subclass.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

The below discussion is organized as follows. Section I presents an overview of the present invention method and apparatus for modeling digital signal processors. In Section II, Applicants discuss the creation of a working vector space (e.g., supporting library) of the present invention modeling apparatus and method. Also within Section II, Applicants further explain the invention method by showing examples in modeling the TMS320C54x processor. Within Section III, Applicants explain the transformation from an abstract working vector space to the realization of a supporting library. Applicants introduce a floating-point model vector space in Section IV and discuss the present invention transformation from a floating-point model to a fixed-point model. A conclusion is in Section V.

I. Overview

Figure 10:
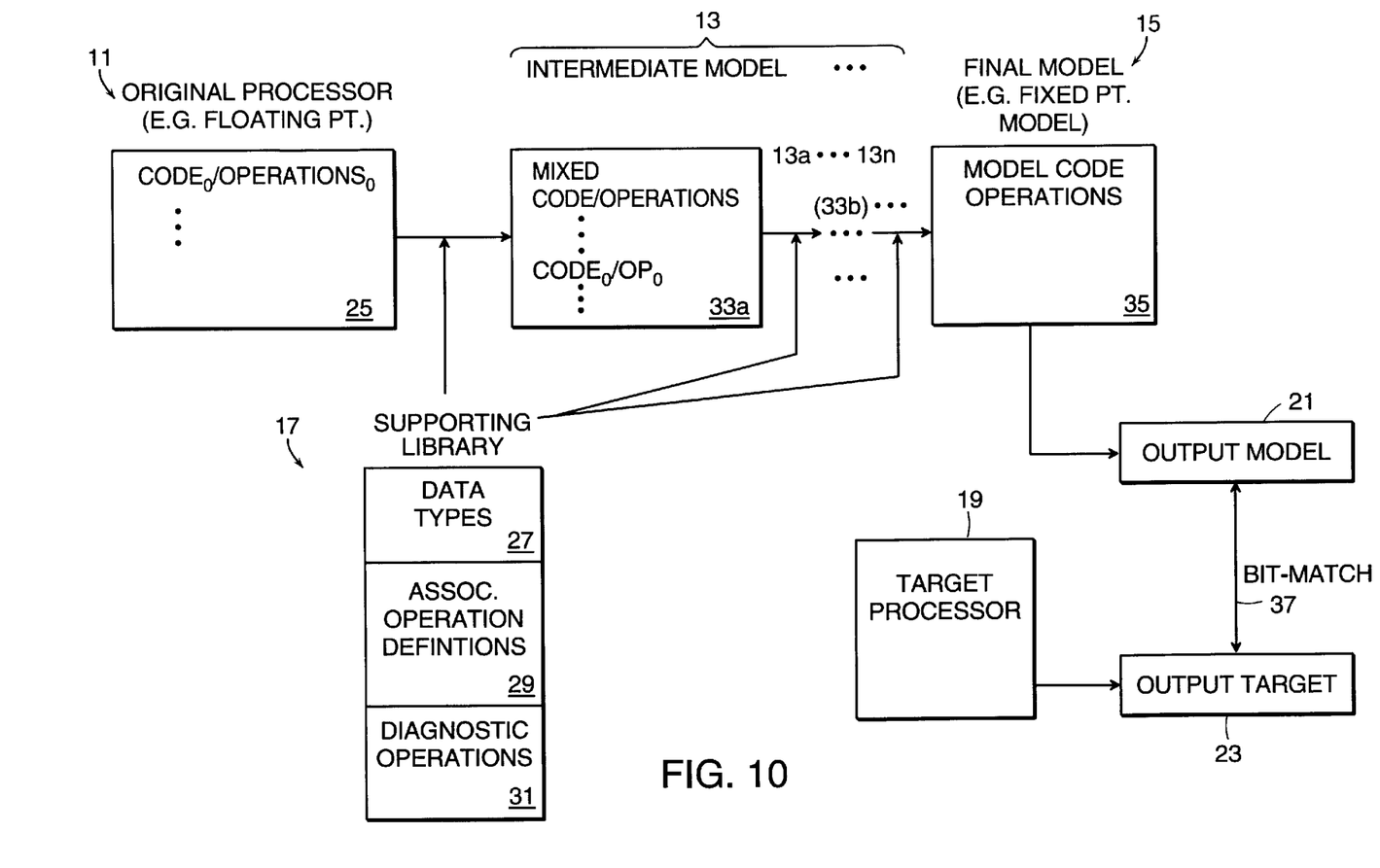
FIG. 10 is a block diagram of an overview of the present invention method and apparatus.

Referring to FIG. 10, the present invention modeling method and apparatus defines operations 29 (such as addition, multiplication, subtraction, division, shifting, AND, OR, and exclusive OR, and the like) for a target processor 19. The target processor 19 may be a fixed-point processor, a floating-point processor or the like, supporting 32-bit or 16-bit or similar data lengths. The present invention also defines data types 27 of the operands for the defined operations. Using these operation and data type definitions 27,29, the present invention models or represents execution of an original program (or set of digital processing code) 25 written for an initial processor 11.

For example, in a conventional DSP floating-point processor (original processor 11 of FIG. 10), the 32-bit 2's complement addition has a saturation threshold. That is, the resulting sum will not be reflected to exceed the saturation threshold even though the actual mathematical sum should be a number greater than the threshold. In the case of the actual sum exceeding the saturation threshold, the floating-point processor merely produces a number at the saturation threshold. The present invention models and reproduces such a 2's complement addition operation (with a saturation threshold) in the target fixed-point processor model 15 (FIG. 10), even though the target processor's 2's complement addition operation normally does not follow saturation arithmetic.

In another example, say that a modem, for receiving digital input and transforming the input into a waveform output, is given. Also, say the transformation procedure is originally written in floating-point C (code 25 of FIG. 10). The present invention enables the transformation procedure to be represented for execution by a fixed-point target processor 19. In the preferred embodiment, the present invention step-wise models 13 or rewrites the subject procedure from the original floating-point C representation 25, to one or more intermediate (mixed floating point and fixed point) representations 33, to a final fixed-point representation 35.

To accomplish the foregoing, the present invention utilizes a collection or library 17 of definitions for various target processors 19. Specifically, the library 17 contains definitions of (a) data types 27 and (b) for each data type, associated operators 29. Further, the library 17 contains definitions which enable functions (operations) of one model to be mixed and matched with functions of another model, to support the above-mentioned step-wise modeling 13 to a desired target processor 19. The preferred embodiment of the present invention library 17 includes diagnostic operations 31 to indicate, for example, the number of times a certain operation occurred, whether a variable exceeded a threshold, and the like. Details of the supporting library 17 of the present invention are discussed below.

Further, the present invention provides the above-described modeling in a manner that is bit-wise matchable (illustrated at 37 in FIG. 10) against the original processor 11 and in human readable terms. In the preferred embodiment, a high level programming language (e.g., C, C++ and the like) is employed by the present invention to represent or model the target processor 19. The high level language, together with the model being bit-wise matchable to the original processor 11, further enhances the step-wise modeling 13 ability of the preferred embodiment, as illustrated and further detailed below.

II. Working Vector/Space Supporting Library 17

A. Distinct Fixed Length Data Representation

All fixed-point DSP's have associated with them a set of fixed bit length data representations for the storage and manipulation of binary information. A fixed bit length data representation is considered distinct if any of the following three conditions are met: 1) the length is different; 2) if the length is the same and an operation exists which will produce a different result given the same input value(s) of identical length and under the same control conditions; 3) if the length is the same and an operation exists which cannot be performed on a data representation of the same length. The term "control conditions" means all status fields, control fields, mode of operation and the like.

The reasoning for condition 1 is as follows. An L1 bit length cannot exactly represent an L2 bit length, unless L1=L2. Suppose L1=16 and L2=32, one cannot use 16 bits to represent 32 bits. One might say, one may use 32 bits to represent 16 bits. For example, the lower 16 bits of a 32-bit representation may be used to simulate a 16-bit representation. From one point of view, the 16-bit simulation is not the same as the actual 16-bit representation for purposes of bit exact similarities. That is, the 16-bit simulation really is 16 zeros followed by 16 binary digits, as compared to just 16 binary digits.

Condition 2 exists when L1=L2 and at least one operation will produce different results with the same identical inputs. For example, a fixed-point DSP may have more than one accumulator and depending on which accumulator is an input and/or an output, an operation produces different results.

Condition 3 exists when L1=L2 and an operation cannot be performed on all representations of the same length, just some. Again, using the multi-accumulator example, at least one operation exists that will not accept all accumulators as an input. For example, on the TMS320C54x processor there are instructions which will produce different results depending on whether the source (input) or destination (output) accumulator is A or B, even if the input value and the control conditions are the same. And, as is for most processors, certain registers which are 16 bits in length cannot be operated on as a 16-bit short data memory operand can.

After identifying all distinct fixed-bit length data representations of a given processor, the present invention groups the different fixed bit length data representations into a set. The set of fixed bit length representations, for a given fixed-point DSP, is referred to herein as the length set vector, $\Lambda=\{\lambda_1,\lambda_2,\ldots \lambda_M\}$ where each $\lambda_i$, for $i=\{1,2,\ldots M\}$, is a non-zero positive integer equal to the length (in bits) of the distinct representation. Thus, M is the total number of distinct representations of information possible on a given fixed-point processor. For example, on the TMS320C54x, the length set vector is equal to $\Lambda_{C54x}=\{40,40,32,16,16\}$. Thus, the TMS320C54x has five distinct data representations; two being 40 bits in length, one 32 bits in length, and the other two, 16 bits in length. The two 40-bit lengths, 32-bit length and two 16-bit lengths are due to the existence of 40-bit accumulator A, 40-bit accumulator B, the ability to address 32-bit operands, 16-bit registers and the ability to address 16-bit operands, respectively.

B. Operator Projection

For ease of explanation and purposes of illustrating the present invention, the following discusses two examples—a C++ implementation and a generalized implementation of the present invention. These are for purposes of illustrating and not limiting the scope of the present invention.

1. C++ Class Hierarchy As stated earlier, each distinct fixed bit length data representation has an associated C++ class. Thus, each $\lambda_i$ has an associated C++ class which, if possible, is derived from another class for the same bit length. The actual procedure for deciding which, if any, class a given distinct fixed bit length representation is derived from is described below in part 2 of this section. As will be understood from part 2, the present invention uses the projection theorem by representing each distinct fixed bit length data representation as a vector space.

Figure 1:
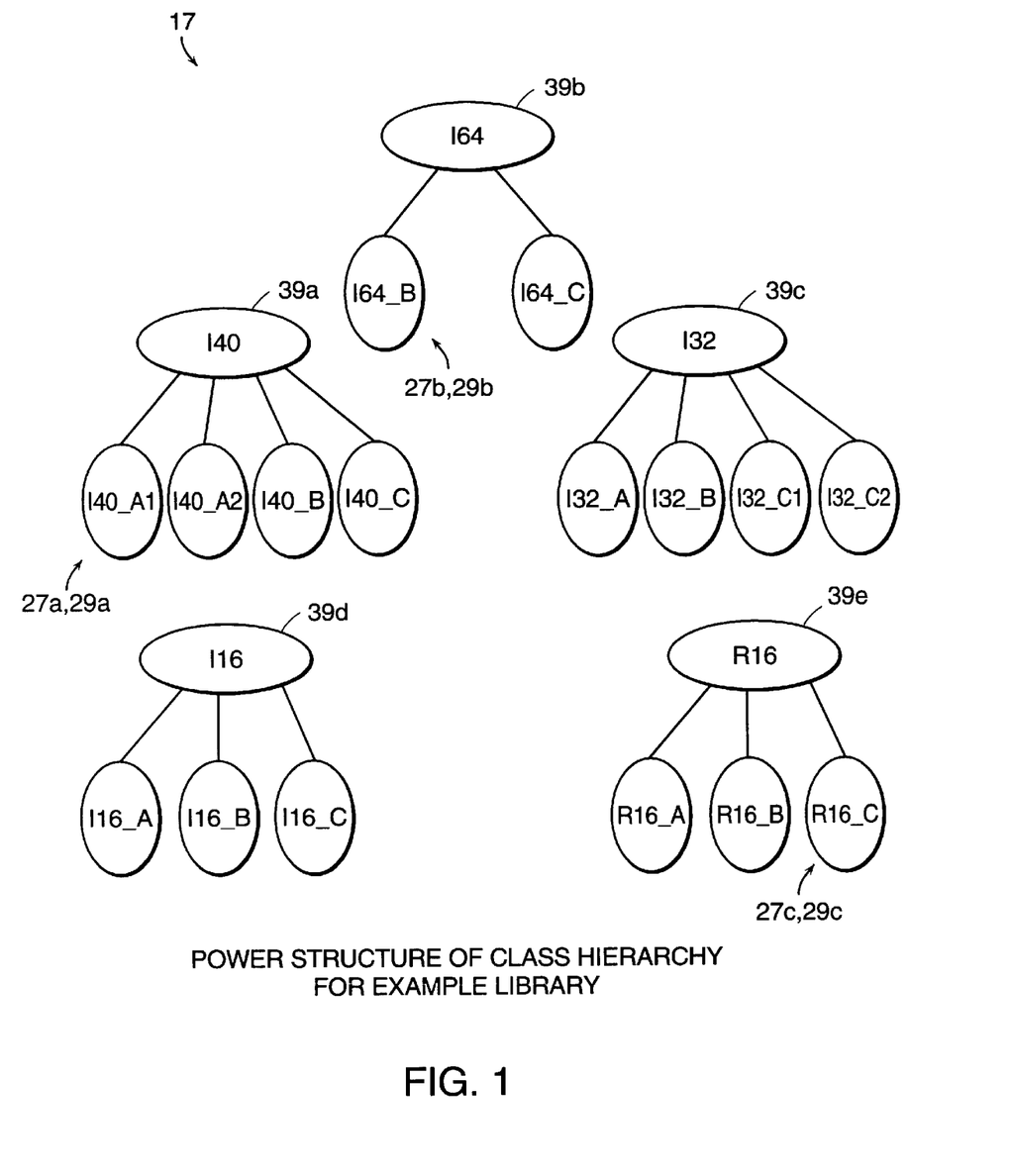
FIG. 1 is a schematic diagram of class hierarchy for a supporting library to model example processors A, B and C in the present invention.

The base class may be an abstract class, which allows pure virtual function declarations or, the base class may define a virtual standard set of operation definitions to be performed on the use of a base class object. The former choice is good in applications where the end-user must choose which DSP fixed-point processor to model since objects of an abstract class cannot be created, while the latter is used in situations where no specific processor is modeled but the standard DSP processor is determined by the library creator. That is, objects of the standard class are allowed. The concept of the base class becomes more clear as Applicants explain the power (or hierarchy) structure of class inheritance as illustrated in FIG. 1.

Suppose one wants to create a library to model DSP fixed-point processors A, B and C. Assume that the length set vectors for DSP processors A, B and C are $$\Lambda_A = [40, 40, 32, 16, 16], \quad M = 5 \quad (1)$$

$$\Lambda_B = [64, 40, 32, 16, 16], \quad M = 5 \text{ and} \quad (2)$$

$$\Lambda_C = [64, 40, 32, 32, 16, 16], \quad M = 6 \quad (3)$$

respectively.

For sake of brevity, the following discusses the details of creating only the class for the 64-bit length data representation of the DSP fixed-point processor B needed to create the supporting library 17. It is understood that the same procedure is applied to the other bit-length data representations. Furthermore, for discussion purposes assume that a base 64-bit base class 39*b*, called I64 in FIG. 1, with virtual operator definitions has already been created. Thus, one needs to create a class, say I64_B, for the 64-bit length data representation 27*b* of fixed-point processor B.

The operators 29*b* (i.e., instructions) to be defined in the I64_B class are grouped into two categories, (a) operators already defined in the I64 base class 39*b* and (b) operators not defined in the I64 base class 39*b*. Think of the category (a) operators as the projection of the I64_B operators onto the I64 operators. Of course, if the projection was the empty set then I64_B will not be derived from I64. Furthermore, the base class 39*b* should not have any operators for which the I64_B class should not implement. Analogous to linear algebra, the previous statement implies that category (a) accompanies all of class I64, the base class 39*b*, such that I64_B is the direct sum of I64 plus category (b) operators. That is, $$I64\_B = I64 \oplus \text{category (b)}. \quad (4)$$

For the present example case, assume that the projection was not the empty set and that all I64 operators are to exist in the I64_B class, such that I64_B is derived from I64.

The invention method divides I64_B operators 29*b* into two orthogonal sets of operators. The first set is accomplished by taking the operator projection of I64 onto I64_B. As referred to herein, the operator projection of class $\alpha$ onto class $\beta$ is indicated as $O(\alpha,\beta)$. The other set is the rest of the I64_B instructions (operators and operations) which need to be initially defined for the implementation of an I64_B object. Therefore, the invention method decomposes the I64_B class into the following:

$$I64\_B = O(I64 \perp I64\_B) \oplus (I64 \perp I64\_B) \quad (5)$$

The last term, $(I64 \perp I64\_B)$, is the set of operators which need to be added to the I64_B class, referred to in equation (4) as "category (b)" operators.

The same methodology is applied to the creation of the rest of the classes (27*a*,29*a* . . . 27*c*,29*c*) until all 16 classes (the total number of classes for processors A, B and C) are created, as illustrated in FIG. 1. Once the invention method has these 16 classes, the supporting library 17 for modeling DSP fixed-point processors A, B and C in a C++ environment is provided. One possible power structure of the class hierarchy for a library 17 to model fixed-point processor A, B and C is shown in FIG. 1. Others are suitable.

Shown in FIG. 1 is the hierarchy structure with (a) two 16-bit length standard base classes 39*d*, 39*e*, i.e., I16 to mimic 16-bit length data operands and R16 to mimic 16-bit length registers, (b) one 32-bit length standard class 39*c* to mimic 32-bit length data operands, (c) one 40-bit length standard class 39*a*, and (d) one 64-bit length standard class 39*b*. The respective classes under each base class 39*a*–39*e* are defined with the data types 27 and operation definitions 29 of the respective corresponding processor A, B, C. As such, the hierarchy structure of FIG. 1 graphically illustrates the contents and relationship/derivation of the contents of supporting library 17.

Examples of the TMS320C54x Supporting Library

Figure 6:
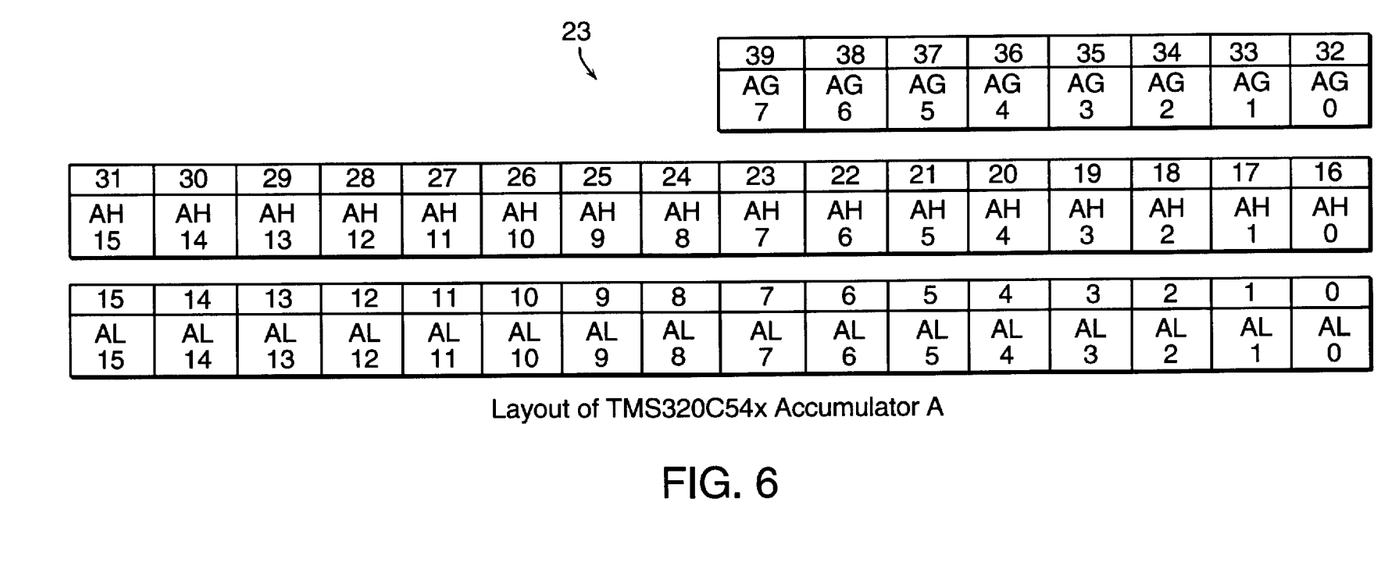
FIGS. 6 and 7 are schematic diagrams illustrating the layout of accumulators A and B, respectively, for processor TMS320C54x.
Figure 7:
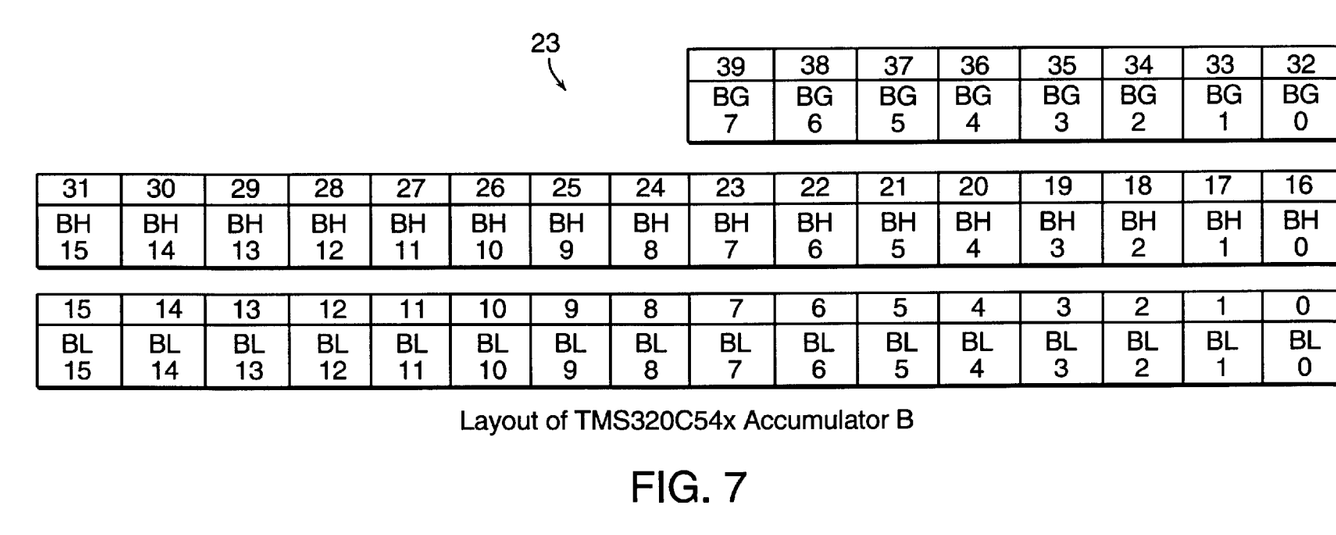

The length set vector for the TMS320C54X, $\Lambda_{C54x}=\{40, 40,32,16,16\}$, contains five (5) elements. Referring to the accumulators (generally at 23 in FIG. 10), the TMS320C54x has two accumulators, referred to as accumulator A and accumulator B, each with a 40-bit length. Each accumulator 23 contains three memory-mapped registers: Guard bits (AG,BG), High-order bits, (AH,BH), and Low-order bits, (AL,BL). As shown in FIG. 6 and FIG. 7, the layouts for the accumulators 23 are the guard bits which are 8 bits in length, while the high-order and low-order bits are 16 bits in length, bringing the total length to 40 bits.

The present invention TMS320C54x I40A/B class is used to declare and define operators and functions which utilize the TMS320C54x accumulator A or B. In other words, if one were to use an assembly instruction equivalent (equivalence with respect to an operator or function in the C++ model), the final result (at 23 in FIG. 10) bit matches with the C++ model result 21. Moreover, in the C++ model, one is able to explicitly state whether a 40-bit variable resides in accumulator A or accumulator B, by creating two separate classes.

Figure 8:
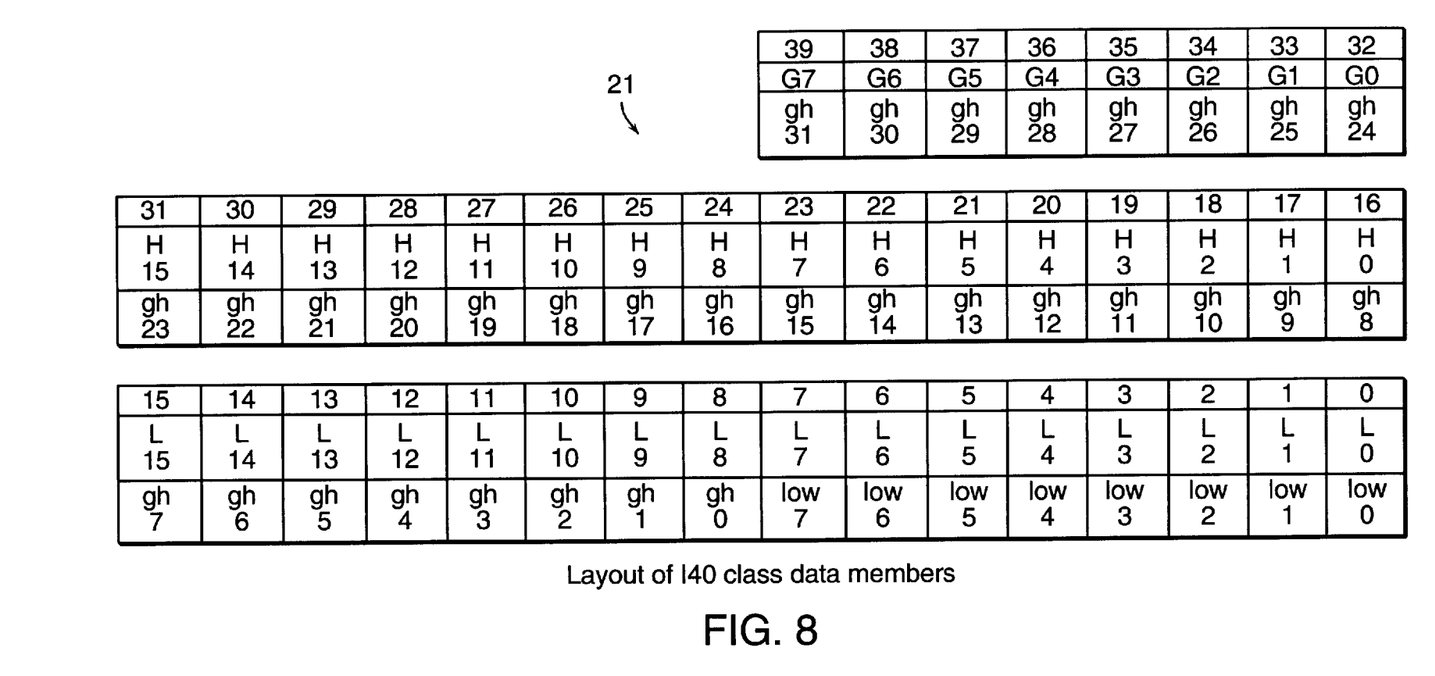
FIG. 8 is a schematic diagram illustrating layout of I40 class data members in the present invention.

The present invention simulation is accomplished by using a 32-bit integer and an 8-bit unsigned character in tandem as the data members for the I40 structure, shown in FIG. 8 as part of 21 (FIG. 10). The 32-bit integer is called guardhi, while the 8-bit character is called low. As shown in the layout in FIG. 8, guardhi contains the 32 MSB's (most significant bits) of the accumulator 23 and low contains the remaining 8 LSB's (least significant bits). In other words, guardhi contains the guard bits, high-order bits, and 8 MSB's of the low-order bits, and low incorporates just the 8 LSB's of the low-order bits.

As a reminder, the I40 layout, in FIG. 8, does not use accumulator specific notation (e.g., AH versus H), since the I40 structure is accumulator independent. That is, the I40 class is a base class for the two accumulators. Simply stated, the ability to do 40-bit manipulation and operations is accomplished by telling guardhi and low what to do for each operator and function defined within this structure 21.

2. Vector Space Hierarchy

In this second example of the present invention, a hypothetically simplified fixed-point DSP, processor C, is to be modeled with an associated length set vector, $\Lambda_{C54x}=\{40, 32,16,16\}$. Furthermore, the hypothetical assumes that the invention method has already generated the working vector sub-space for the two simplified fixed-point DSP's, processor A and B, with associated length set vectors, $\Lambda_A=\{64,40, 32,16,16\}$ and $\Lambda_B=\{40,32,16,16\}$, respectively.

After determining the length set vector for the fixed-point DSP to be modeled, the invention method proceeds to the operator projection procedure as mentioned above. The object (goal) of the operator projection is to determine the projection of a fixed bit length data representation for the processor to be modeled, processor C, onto the data representations of equal length associated with processors already modeled, processors A and B. The projection is with respect to the input/output relation for all instances over all operators. What is meant by an instance of an operator is an allowed syntax. For example, if an ADD operator is able to take as its inputs either two 40-bit representations or two 32-bit representations with both cases producing a 40-bit output, then there are two instances of the ADD operator.

One may think of each instance as a vector with each input and output representation as an element. For consistency, the present invention method assumes that multi-output and multi-input operators exist, with the ordering of the instance vector being multi-output representations followed by the multi-input representations. Suppose an instance has M outputs and N inputs, then the instance vector is [output$_1$, output$_2$, ; . . . , output$_M$, input$_1$, input$_2$, . . . , input$_N$]. For example, the instance vectors for the ADD operator example are [40 40 40] and [40 32 32]. It is noted that the present invention method purposely makes a distinction between inputs and outputs, since for certain operators under specific processors, all inputs and outputs do not use the same distinct representations. For example, a 40-bit length may be allowed as the first input but not as the second input argument.

The invention method uses the operator projection to determine if processor C is more similar to processor A or to processor B. The invention method performs the operator projection between processor C and A, as well as, processor C and B, for each fixed bit length data representation of processor C, (i.e., each $\lambda_i$ of $\Lambda_c$) Furthermore, there is a degree of freedom which is termed the "pivot point", in performing the operator projection, as to where in the instance vector the given $\lambda_i$ is. Assuming $\lambda_i=40$, the present invention method may choose to perform the operator projection between the different operator instances with a specific 40-bit output or 40-bit input. Applicants have found that using the first input as a pivot point fits in well when the present invention translates the working vector space to a supporting library in the preferred C++ embodiment.

Next the present invention determines the operator projection for the 40-bit data representation of processor C, I40C as follows. All operators associated with a given processor have an indicator matrix. The indicator matrix is used to represent the valid input and output relationship for a given operator under said fixed-point DSP. For example, assume processor C's add operator has the following input/output pattern in the form OUT1=IN1+IN2:

I40C=I40C+I40C; I40C=I40C+I32C

I40C=I40C+I16C; I40C=I32C+I40C

I40C=I32C+I32C; I40C=I32C+I16C

The indicator matrix for processor C's add operator, $M_{C\_Add}$ is shown in (1). Each row of an indicator $$M_{C\_Add} \begin{matrix} 1000 & |1000| & 1000 \\ 1000 & |1000| & 0100 \\ 1000 & |1000| & 0010 \\ 1000 & |0100| & 1000 \\ 1000 & |0100| & 0100 \\ 1000 & |0100| & 0010 \end{matrix} \quad (1)$$

matrix represents an instance of the associated operator. That is, an instance vector defined earlier. For processor C's add operator, the instance vector's first element indicates the output type. The second element indicates the first input argument type, and the third element indicates the second input argument type. Furthermore, each element of the 6×3 indicator matrix has been represented as a binary digit. The order of indication of argument type for each element, going from most significant bit to least significant bit is I40C, I32C, I16C and R16C. Hence, the name "indicator matrix" is indicative of the generated matrix. In general, the number of elements in a row is equal to the number of outputs plus the number of inputs for a given operator. The element value corresponds to $2^{M-i}$, where i indicates the index, $\lambda_i$, for the data representation.

Suppose the indicator matrix for processor A's add operator, $M_{A\_Add}$, is as shown in (2).

$$M_{A\_Add} = \begin{matrix} 10000 & |10000| & 10000 \\ 10000 & |10000| & 01000 \\ 01000 & |01000| & 01000 \\ 01000 & |01000| & 00100 \\ 01000 & |00100| & 01000 \\ 01000 & |00100| & 00100 \end{matrix} \quad (2)$$

The 64-bit, 40-bit, 32-bit, 16-bit length data representations of processor A are referred to as I64A, I40A, I32A and I16A or R16A, respectively, with R16A referring to the registers. Thus, each element may take on one of M=5 values, {10000, 01000, 00100, 00010, 00001}, to indicate the output/input types as an I64A, I40A, I32A, I16A or R16A, respectively. The indicator matrix for processor B's add operator MB Add, is shown in (3). The 40-bit, 32-bit and 16-bit length data representations of processor B are referred to as I40B, I32B, and I16B, respectively, with R16B referring to the registers. Thus, each element may take on one of M=4 values, {1000, 0100, 0010, 0001}, to indicate the output/input types as an I40B, I32B, I16B or R16B, respectively.

$$M_{B\_Add} = \begin{matrix} 1000 & |1000| & 1000 \\ 1000 & |0100| & 1000 \\ 1000 & |0100| & 0100 \\ 1000 & |0100| & 0010 \end{matrix} \quad (3)$$

Now to proceed with the operator projection of I40C onto I40B and I40C onto I40A. The present invention next determines the error vector $E_{I40C/A}$, in the operator domain, between I40C and I40A. The mathematical representation for the error vector between I40C and I40A is shown in (4). While, the error vector between I40C and I40B, $E_{I40C/B}$, is represented in (5).

$$E_{I40C/A} = I40C - (I40C, I40A)_o I40A. \quad (4)$$

$$E_{I40C/B} = I40C - (I40C, I40B)_o I40B. \quad (5)$$

Since the indicator matrix for the operator has been shown in (1), next is shown the operator projection for the add operator. The procedure is of course repeated for all operators of processor C. First, the operator projection determines, for just the add operator, $(I40C, I40A)_o I40A$. Next needed are the instances (i.e., rows) from the indicator matrix for each processor where the first input to the add operator is a 40-bit length representation.

The 40-bit length add instances for processor C, $M_{I40C\_Add}$, are shown in (6) while the processor A 40-bit length instances, $M_{I40A\_Add}$, are shown in (7).

$$M_{I40C\_Add} = \begin{matrix} 1000 & |1000| & 1000 \\ 1000 & |1000| & 0100 \\ 1000 & |1000| & 0010 \end{matrix} \quad (6)$$

$$M_{I40A\_Add} = \begin{matrix} 01000 & |01000| & 01000 \\ 01000 & |01000| & 00100 \end{matrix} \quad (7)$$

Notice that processor C has three instances with 4-bit elements, while processor A has two instances with 5-bit elements. Since the operator projection involves a bit-wise AND operation, the present invention needs to modify the instances for bit-wise compatibility. For the processor C instances, the present invention adds a 0 MSB, and for processor A adds an all-zero instance. In general, the number of instances must be the same. If need be, the present invention simply adds all-zero instances. Similarly, the number of bits must be the same. For the example case, the present invention concatenates a zero as a most significant bit. The modified instances for processor C, $M_{I40C\_Add}$, and processor A, $M_{I40A\_Add}$, are shown in equations (8) and (9), respectively.

$$M_{I40C\_Add} = \begin{matrix} 01000 & |01000| & 01000 \\ 01000 & |01000| & 00100 \\ 01000 & |01000| & 00010 \end{matrix} \quad (8)$$

$$M_{I40A\_Add} = \begin{matrix} 01000 & |01000| & 01000 \\ 01000 & |01000| & 00100 \\ 00000 & |00000| & 00000 \end{matrix} \quad (9)$$

The indicator matrix, $M_{(I40C, I40A)_o I40A}$ for the add operator projection, shown in (10); is determined by performing a bit-wise AND between $M_{I40C\_Add}$ and $M_{I40A\_Add}$.

$$M_{(I40C, I40A)_o I40A} = \begin{matrix} 01000 & |01000| & 01000 \\ 01000 & |01000| & 00100 \end{matrix} \quad (10)$$

Finally, the indicator matrix for the error vector $ME_{I40C/A}$, shown in (11) is determined by an exclusive-OR operation between the indicator matrix for the add operation projection, $M_{(I40C, I40A)_o I40A}$, and the modified indicator matrix for the processor C add operator, $M_{I40C\_Add}$.

$$ME_{I40C/A} = 10000|01000|00010 \quad (11)$$

This indicates that the instances of processor C's add operator where the first input is a 40-bit length exist in processor A, except when the second input is a 16-bit representation.

The process is repeated for the add operator projection of processor C onto processor B. The resulting indicator matrix, $M_{(I40C, I40B)_o I40B}$, for the add operator is shown in (12). While the indicator matrix for the error vector $ME_{I40C/B}$, is shown in (13).

$$M_{(I40C, I40B)_o I40B} = 1000 \; |1000| \; 1000 \quad (12)$$

$$ME_{I40C/B} = \begin{matrix} 1000 & |1000| & 0100 \\ 1000 & |1000| & 0010 \end{matrix} \quad (13)$$

After completing the above procedure for all operators defined in C, the present invention performs a norm operation on the error vectors between processor C and processor B, as well as between processor C and processor A. One possibility is the uniform instance norm, which simply adds up the number of error instances. For example, the uniform instance norm for the add operator error vector, $E_{I40C/B}$, between processor C and B is 2. While for the add operator error vector $E_{I40C/A}$ between processor C and A, the uniform instance norm is 1. Based on the add operator uniform instance norm, the present invention concludes that processor A is more similar to processor C.

Alternatively, one may also define a weighted instance norm which places more weight on certain operators by multiplying the uniform instance norm of a given operator by a user-specified constant. One may also place more weight on a multi-input/multi-output operator by multiplying the uniform instance norm by the number of inputs and/or outputs for a given instance. Basically, the norm definition is another degree of freedom within the invention process.

III. Projection Outcomes

The simplified hypothetical example presented above shows one of five possibilities when performing an operator projection. Next shown are all possible cases in general linear algebraic terminology, with an illustration of resulting class hierarchy in FIG. 9. Within the explanation of each case, the following shows how to implement the given situation in an implementation of the working vector space in the C++ environment implementation. Recall that in the supporting library 17, each fixed bit length representation 27 is represented as a C++ class.

Suppose the minimum norm for the 40-bit length representation operator projection of processor C is the operator projection of processor C onto processor B. One possibility, Applicants refer to as Case A, is the operator projection $(I40C, I40B)_o I40B$, equals I40B. However, I40B does not equal I40C, such that the error vector is not zero. Case A implies all instances of processor B operators exist as instances of processor C operators. However, processor C contains instances of operators which do not exist in processor B. This is another way of stating I40B is a sub-space of I40C as depicted in (14). The second term on the right hand side is the error vector, $E_{I40C/B}$, described in the previous section.

$$I40C = (I40C, I40B)_o I40B + (I40C \perp I40B) \quad (14a)$$

$$I40C = I40B + (I40C \perp I40B) \quad (14b)$$

For the supporting library 17, Case A means the I40C class is derived from the I40B class. At the moment, the I40C class must define the instances of operators 29 that do not exist in the I40B class. That is, the error vector, $I40C \perp I40B$. Now the present invention is ready to determine if any of the I40B operators need to be overloaded (i.e., redefined) within I40C. An instance of an I40C operator overloads a derived I40B operator instance, if an instance of any I40B operator exists which produces a different output as compared to the same instance of the I40C operator.

Another possibility, referred to as Case B, is the operator projection, $(I40C, I40B)_o I40B$, equals I40, where I40 is a sub-space of I40B and a sub-space of I40C. Thus, I40B does not equal I40C, such that the error vector is not zero. Case B implies only some of the instances of processor B operators exist as instances of processor C operators. Hence, processor C contains instances of operators which do not exist in processor B. Case B is represented mathematically in (15). The second term on the right hand side is the error vector, $E_{I40C/B}$, described in the previous section.

$$i\ I40C = I40 + (I40C \perp I40B) \quad (15)$$

For the supporting library 17, Case B means the I40C class is derived from the I40B class. At the moment, the I40C class must define the instances of operators that do not exist in the I40B class. That is, the error vector, $I40C \perp I40B$. Now use the same methodology described for Case A to determine if any of the I40B operators contained within the I40 space need to be overloaded (i.e., redefined) within I40C.

The next possibility, referred to as Case C, is the operator projection, $(I40C, I40B)_o I40B$, equals $\emptyset$, the empty set. Case C implies none of the instances of processor B operators exists as instances of processor C operators. In other words, I40B is completely orthogonal to I40C.

For the supporting library 17, Case C means the I40C class cannot be derived from the I40B class. Thus, I40C becomes a new base class. Within the I40C class, the present invention creates and defines all instances of all I40C operators.

Next, the present invention considers what is referred to as Case D, the operator projection, $(I40C, I40B)_o I40B$, is equal to I40B. Furthermore, I40B equals I40C which results in a zero uniform instance norm for the error vector. That is, $I40C \perp I40B$ equals the empty set. Case D implies that all instances of all processor C operators exist as instances of processor B operators and vice-versa.

For the supporting library 17, Case D means the I40C class is derived from the I40B class. The methodology described for Case A is used to check if any of the instances of the I40B operators need to be overloaded within the I40C class. If none of the instances of the I40B operators need to be overloaded, there is no reason to create an I40C class.

The last possibility, referred to as Case E, is the operator projection, $(I40C, I40B)_o I40B$, equals I40C. Furthermore, I40C is a sub-space of I40B, which also results in a zero uniform instance norm for the error vector. Case E implies that all instances of all processor C operators exist as instances of processor B operators but not vice-versa.

For the supporting library 17, Case C means that the I40B class is derived from the I40C class as opposed to the usual opposite scenario. That is, I40C becomes the parent of I40B. The methodology described for Case A is used here to check if any of the instances of the I40C operators need to be overloaded within the I40B class.

Figure 9:
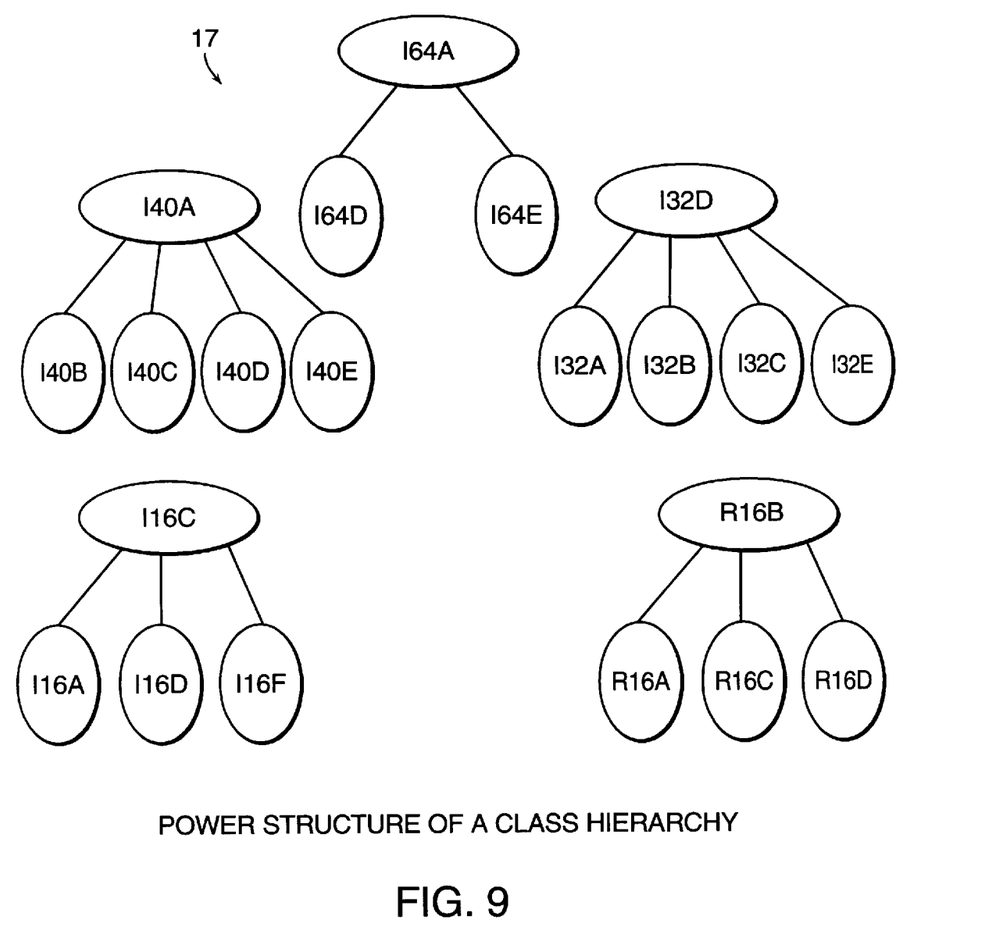
FIG. 9 is a schematic diagram of class hierarchy for a working vector space to model example processors A, B and C in the general example of the present invention.

The procedure is repeated for all fixed-length distinct representations of processor C in order to incorporate processor C into the supporting library 17. As stated earlier, the processor C vector sub-space is the direct sum of all of the data representation sub-spaces, I40C, I32C and I16C. The processor C vector sub-space translates to a C++ class of data representation classes in the supporting library 17. The processor C class is a class of classes. The existence of all processor classes forms the analogy to the working vector space. One possible power structure for a class hierarchy of the foregoing supporting library 17 is shown in FIG. 9.

IV. Converting a Floating Point Model to a Fixed Point Model

Referring back to the example of FIG. 1, the invention floating-point model uses C++ classes for creating instances of variables. The invention floating point data representation is implemented by a C++ class, called "FLOAT". The invention attaches various data members to the class FLOAT to keep track of pertinent information for transforming a floating-point model to a fixed-point model. In the more generalized example of FIG. 9, all floating-point models of a given operation or function use a floating-point class as a data type instead of just a float or a double type. The base floating point class has the following members: data, maxabs, varabs and avgabs, all of which are of type float or double. The preferred embodiment employs the following data members:

Value=current value (variable's contents)
Max_abs=running maximum of the absolute of Value
Min_abs=running minimum of the absolute of Value
Avg_abs=running average of the absolute of Value
Var_abs=running variance of the absolute of Value
Read_count=number of read accesses made of Value
Store_count=number of write accesses made of Value.

The invention method also declares global variables to keep track of the number of times a given function is called. In the preferred embodiment, the invention method keeps track of all mathematical operations (addition, multiplication, subtraction, division). Having the foregoing information provided by the preferred embodiment on any variable declared as a FLOAT, aids in determining the computational complexity, dynamic range, scaling effects, and Q storage format.

Now turn to converting a floating-point model 11 (FIG. 10) of an algorithm 25 (i.e., operation or function) to a given fixed-point processor model 15. Suppose the floating-point model 11 of the operation calls N modules, then a fixed-point model 15 is needed for each of the N modules under each processor 19 desired to be modeled. Situations will also arise when one wants to convert certain modules to a fixed-point processor model 13 while leaving other modules as a floating-point model 11. One scenario may be a fixed-point encoder in tandem with a floating point decoder, or another scenario may be to convert only one module to a fixed-point model at a time and still be able to execute a subject operation (function) with floating point modules. Such are generally illustrated as intermediate models 13a . . . 13n in FIG. 10.

Figure 2:
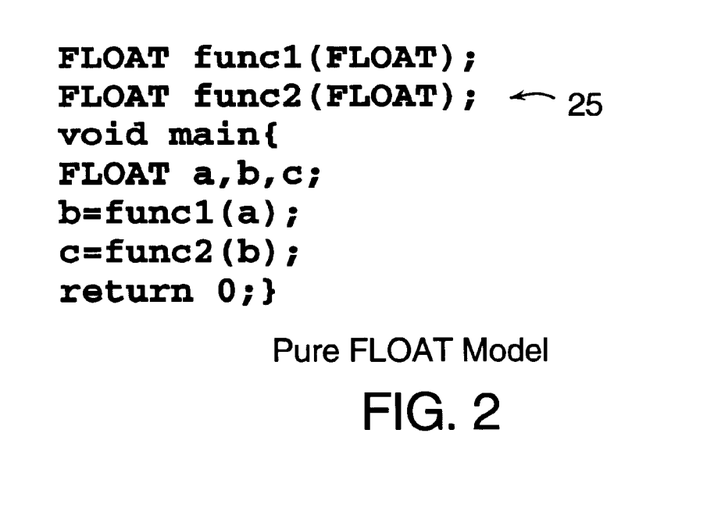
FIG. 2 is an illustration of a pure float model example of an operation of one of the processors in FIG. 1, using the present invention.
Figure 3:
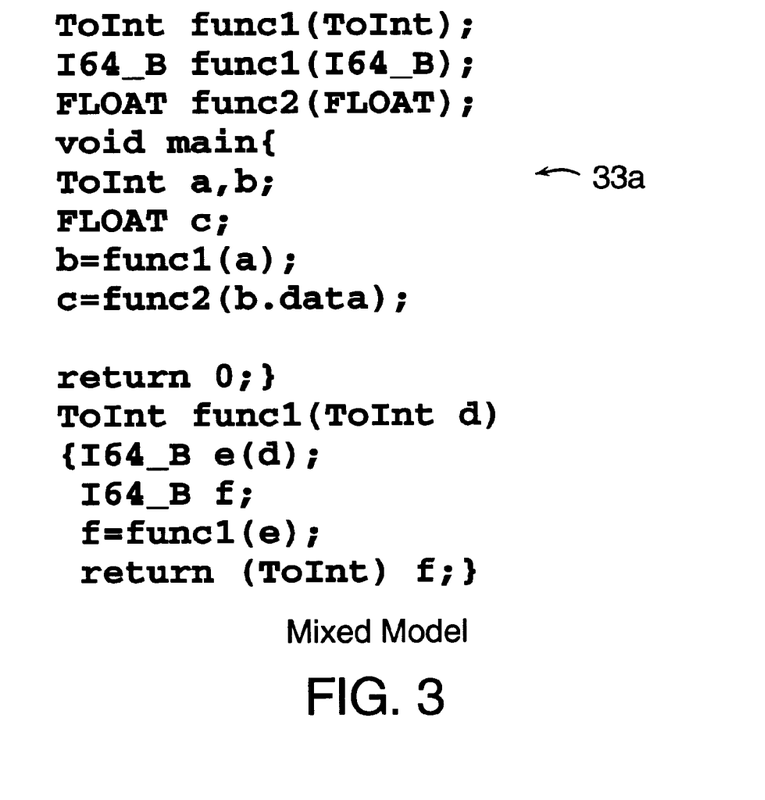
FIGS. 3 and 4 illustrate a mixed fixed-point and floating-point model including the processor operation of FIG. 2 using the present invention.
Figure 4:
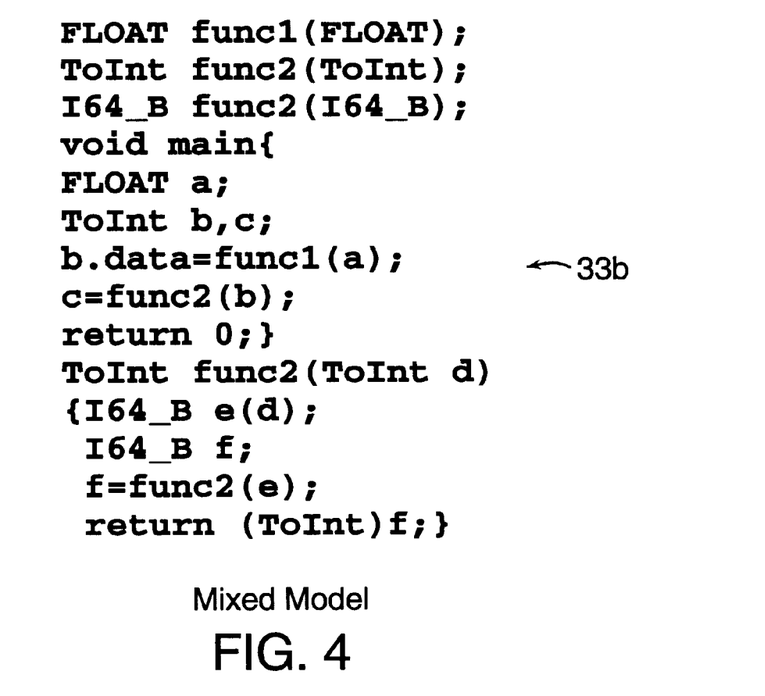
Figure 5:
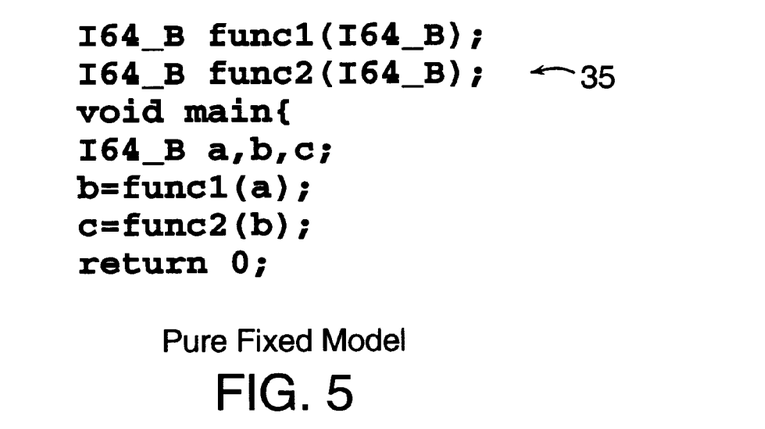
FIG. 5 illustrates the fixed-point model of the FIG. 2 processor operation using the present invention.

In order to accomplish the dual existence (in intermediate models 13) of a fixed-point and floating-point model, the present invention creates an interface class, to do exactly that, interface a fixed-point module with a floating point module. In one embodiment, the interface class is referred to as a "TOINT" with a public data member, called "DATA", of class type FLOAT. For sake of brevity, let N=2 and say a fixed-point processor B model 15 is desired for the pure float model 11 example operation (function) 25 shown in FIG. 2. In FIG. 3, a fixed-point model of FUNC1 ( ) with a floating point model of FUNC2 ( ) is tested, while in FIG. 4 the roles of the modules are reversed. Thus, FIG. 3 illustrates the example operation 33a in a first intermediate model 13a, and FIG. 4 illustrates an incrementally changed example operation 33b of a second or subsequent intermediate model 13b. Then, in FIG. 5, both modules are shown as being fixed point modules 35 of the desired final model 15.

By taking advantage of C++ function mangling, the preferred embodiment creates three definitions of a module (i.e., same function name): floating-point definition, fixed-point definition, and interface definition. The interface definition accepts as arguments interface class objects with data members of class type FLOAT, then converts the objects to a fixed-point data representation class for the desired DSP 19, in the example C++ case a 64-bit length data representation for processor B, I64__B. Then, the interface definition calls the fixed-point definition, which returns a fixed-point class object to the interface definition. The returned fixed-point class object is converted to an interface class object upon return to the calling function of the interface definition.

The key feature is that the invention easily simulates the processor operation (function) on another processor by replacing all instances of I64__B objects with a data representation of the target processor 19. Furthermore, one is able to have assembly level characteristics in the C++ environment since the invention defines the behavior of all operations under all control conditions. For example, the add operators are able to simulate sign extension mode, overflow mode, etc.

V. Conclusion

Using the present invention approach, one creates a class structure (supporting library 17 or vector space), with an efficient class hierarchy, for accurately modeling various DSP fixed-point processors 19 (preferably in a C++ environment). Furthermore, the supporting library 17 (vector space) is an adaptive library. Adaptive in the sense that other fixed-point processors (sub-spaces) may be added in their entirety or for a current library fixed-point processor, its associated operators and their definitions 27,29 may be added, removed or modified as needed.

Once a supporting library 17 of the present invention is available for a given set of processors, any operation (function or algorithm) is able to be modeled under any fixed-point processor (sub-space) of the library 17 (vector space). The multi-processor capability of the invention supporting library 17 facilitates the comparison of an operation/function under different fixed-point processors 19 without necessarily coding at assembly level.

Moreover, by using a supporting library 17 of the present invention, the development time involved in going from a fixed-point model 15 to an assembly level version for a given operation (function or algorithm) is dramatically reduced. The reduction is possible since a fixed-point model 15 of the present invention has assembly level characteristics built into it.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the foregoing discusses modeling floating point arithmetic on a fixed point processor. This is not meant to be a limitation but rather an illustration of the present invention. Other target processors and any variety of operations/functions are suitable.

What is claimed is:

1. In a computer system, a method of modeling a digital processor, comprising the steps of:

providing to a host processor data representations and indications of operations of a target processor; and in the host processor, using a high level programming language that enables user definition of data types for the data representations and user definition of operations of the target processor, forming expressions indicative of the data representations and operations of the target processor including saturation arithmetic, sign extension and overflow mode of the target processor and with the formed expressions, modeling in the host processor the target processor executing a program such that model generated data is matchable on a bit level to machine language output generated by the target processor during execution of the program such that diagnosing of target processor operation is enabled.

2. A method as claimed in claim 1 wherein the step of using a high level programming language includes modeling in a manner such that the model generated data is in human readable terms instead of machine code.

3. A method as claimed in claim 1 further comprising the step of executing working code on the target processor, such that said target processor generates working data, and wherein the step of modeling includes generating model data corresponding to the working data generated by the target processor in a manner such that the model data is (i) bit-wise matchable to the target processor generated working data, and (ii) in human readable terms.

4. A method as claimed in claim 1 wherein the step of modeling further comprises the steps of:

for a given source processor, (a) determining each distinct fixed bit length data representation, and (b) grouping the determined distinct data representation to form a set;

for each target processor, repeating steps (a) and (b) such that respective sets are formed; and forming a hierarchy of the formed sets by correlating one set to another such that a base class with depending subclasses are generated and form the hierarchy, each set being defined by one of the base class and a subclass.

5. A method as claimed in claim 1 wherein the step of forming and modeling includes defining operations in an incremental fashion such that one target processor operation at a time is defined and modeled using the high level programming language.

6. A method as claimed in claim 1 further comprising the step of generating diagnostic data corresponding to said modeling.

7. A method as claimed in claim 6 wherein said step of generating diagnostic data includes indicating number of times different operations of the target processor are encountered/processed during said modeling.

8. A method as claimed in claim 1 wherein the step of modeling is incremental, such that a first set of certain data representations and operations of the target processor is modeled using the high level programming language to form an intermediate model of the target processor, and subsequent to the formation of the intermediate model, at least a second set of data representations and operations of the target processor is modeled using the high level programming language to increment the intermediate model toward a final desired model of the target processor.

9. In a computer system having a host processor, apparatus for modeling a digital processor, comprising
   a source of data representations and operations of a target processor; and
   a modeling routine coupled to the source for execution on the host processor, the modeling routine using a high level programming language that enables user definition of data types for the data representations and user definition of operations of the target processor, and the modeling routine forming expressions indicative of the data representations and operations of the target processor to model the target processor executing a program, including simulating saturation arithmetic, sign extension and overflow mode of the target processor, said model generating model data which is matchable on a bit level to machine language output generated by the target processor during execution of the program and which enables diagnosis of target processor operation.

10. Apparatus as claimed in claim 9 wherein the modeling routine generates model data which is in human readable terms instead of machine code.

11. Apparatus as claimed in claim 9 wherein the source defines operations of the target processor in terms of the high level programming language.

12. Apparatus as claimed in claim 11 wherein the source further defines data types for the data representations of the target processor using the high level programming language.

13. Apparatus as claimed in claim 12 wherein the source is formed by the steps of:
   for a given source processor, (a) determining each distinct fixed bit length data representation, and (b) grouping the determined distinct data representation to form a set;
   for each target processor, repeating steps (a) and (b) such that respective sets are formed; and
   forming a hierarchy of the formed sets by correlating one set to another, such that a base class with depending subclasses are generated and form the hierarchy, each set being defined by one of the base class and a subclass.

14. Apparatus as claimed in claim 12 wherein the modeling routine enables target processor operations to be defined incrementally, such that one target processor operation at a time is defined and modeled using the high level programming language.

15. Apparatus as claimed in claim 9 wherein the source further includes definitions of diagnostic operations; and
   further comprising a diagnostic subroutine coupled between the source and the modeling routine, the diagnostic subroutine generating diagnostic data corresponding to said modeling by the modeling routine.

16. Apparatus as claimed in claim 15 wherein the diagnostic data includes number of times different operations of the target processor are encountered during said modeling by the modeling routine.

17. Apparatus as claimed in claim 9 wherein the modeling routing models the target processor incrementally, such that the modeling routine models a first set of certain data representations and operations of the target processor using the high level programming language, to form an intermediate model of the target processor, and subsequent to the formation of the intermediate model, the modeling routing models at least a second set of data representations and operations of the target processor using the high level programming language, to increment the intermediate model toward a final desired model of the target processor.

18. In a computer system, a method of modeling a digital processor, comprising the steps of:
   providing to a host processor data representations and indications of operations of a target processor;
   using a high level programming language in the host processor, forming expressions indicative of the data representations and operations of the target processor, and with the formed expressions, modeling in the host processor the target processor executing a program such that model generated data is matchable on a bit level to machine language output generated by the target processor during execution of the program; and
   generating diagnostic data corresponding to said modeling.

19. A method as claimed in claim 18 wherein said step of generating diagnostic data includes indicating number of times different operations of the target processor are encountered/processed during said modeling.

20. In a computer system having a host processor, apparatus for modeling a digital processor, comprising:
   a source of data representations and operations of a target processor, said source including definitions of diagnostic operations;
   a modeling routine coupled to the source for execution on the host processor, the modeling routine using a high level programming language and forming expressions indicative of the data representations and operations of the target processor to model the target processor executing a program, said model generating model data which is matchable on a bit level to machine language output generated by the target processor during execution of the program; and
   a diagnostic subroutine coupled between the source and the modeling routine, the diagnostic subroutine generating diagnostic data corresponding to said modeling by the modeling routine.

21. Apparatus as claimed in claim 20 wherein the diagnostic data includes number of times different operations of the target processor are encountered during said modeling by the modeling routine.

* * * * *